United States Patent
Kim

(10) Patent No.: US 10,838,627 B2
(45) Date of Patent: Nov. 17, 2020

(54) MEMORY SYSTEM AND METHOD OF OPERATING THE SAME

(71) Applicant: SK hynix Inc., Gyeonggi-do (KR)

(72) Inventor: Jong Wook Kim, Chungcheongbuk-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/380,433

(22) Filed: Apr. 10, 2019

(65) Prior Publication Data

US 2020/0073558 A1    Mar. 5, 2020

(30) Foreign Application Priority Data

Sep. 5, 2018    (KR) .................. 10-2018-0106199

(51) Int. Cl.
*G06F 3/06*     (2006.01)
*G06F 12/02*    (2006.01)

(52) U.S. Cl.
CPC .......... *G06F 3/0614* (2013.01); *G06F 3/0659* (2013.01); *G06F 12/0246* (2013.01); *G06F 12/0261* (2013.01)

(58) Field of Classification Search
CPC .. G06F 3/0659; G06F 12/0246; G06F 3/0614; G06F 12/0261
USPC ......................................................... 711/154
See application file for complete search history.

(56) References Cited

U.S. PATENT DOCUMENTS

2017/0269992 A1*  9/2017  Bandic .................. G06F 11/108

FOREIGN PATENT DOCUMENTS

KR    10-2013-0061967    6/2013
KR    10-2016-0096435    8/2016

* cited by examiner

*Primary Examiner* — Hua J Song
(74) *Attorney, Agent, or Firm* — IP & T Group LLP

(57) ABSTRACT

A memory system includes a storage device including a plurality of dies in which data is stored, and a memory controller configured to control an operation of the storage device, wherein the dies store pieces of reliability grade information about the respective dies, and wherein the memory controller receives the pieces of reliability grade information from the dies, sets reference values for managing the dies depending on the received reliability grade information, and manages the respective dies based on the reference values.

19 Claims, 10 Drawing Sheets

| REL_GR | EWC | RR |
|---|---|---|
| 1 | 0~0.3k | 500k |
| 1 | 0.4k~3k | 350k |
| 1 | 3.1k~6k | 300k |
| 1 | 6.1k~9k | 250k |
| 2 | 0~0.3k | 450k |
| 2 | 0.4k~3k | 300k |
| 2 | 3.1k~6k | 250k |
| 2 | 6.1k~9k | 200k |
| ⋮ | ⋮ | ⋮ |
| A | 0~0.3k | BB1k |
| A | 0.4k~3k | BB2k |
| A | 3.1k~6k | BB3k |
| A | 6.1k~9k | BB4k |

| REL_GR | DI | PGM_C |
|---|---|---|
| 1 | DI1 | C1 |
| | DI3 | C2 |
| | DI4 | C3 |
| 2 | DI2 | C4 |
| | DI5 | C5 |
| | DI6 | C6 |
| ⋮ | ⋮ | ⋮ |
| A | DI10 | CB1 |
| A | DI15 | CB2 |
| A | DI20 | CB3 |

81    82

31a or 37a

| REL_GR | DI | FBN |
|---|---|---|
| 1 | DI1, DI3, DI4 | 2 |
| 2 | DI2, DI5, DI6 | 4 |
| 3 | DI8, DI12, DI14 | 6 |
| ⋮ | ⋮ | ⋮ |
| A | DI10, DI15, DI20 | 10 |

81

82

MEMORY SYSTEM AND METHOD OF OPERATING THE SAME

CROSS-REFERENCE TO RELATED APPLICATION

The present application claims priority under 35 U.S.C. § 119(a) to Korean patent application number 10-2018-0106199, filed on Sep. 5, 2018, the entire disclosure of which is herein incorporated by reference in its entirety.

BACKGROUND

Field of Invention

Various embodiments of the present disclosure generally relate to a memory system and a method of operating the memory system, and more particularly, to a memory system, which differently controls dies in the memory system depending on the characteristics of the dies, and a method of operating such memory system.

Description of Related Art

A memory system may include a storage device which stores data and a memory controller which controls the storage device. The memory controller may control the storage device in response to a request received from a host, and may perform an internal operation for managing the storage device even if in the absence of a request from the host.

The storage device may include a plurality of dies.

The plurality of dies are manufactured on a wafer. Due to the properties of a manufacturing process, dies manufactured on a single wafer may have different electrical characteristics depending on positions on the wafer. For example, it is ideal to use the same amount of liquid or gas, such that it is uniformly used in all regions of the wafer, but, in practice, there may be slight differences in the amount of liquid or gas used depending on the positions on the wafer. Further, due to various causes in addition to the amount of liquid or gas used, the electrical characteristics of dies may slightly differ depending on the positions on the wafer.

SUMMARY

Various embodiments of the present disclosure are directed to a memory system capable of managing a storage device included therein based on the electrical characteristics of dies, and a method of operating such memory system.

An embodiment of the present disclosure may provide for a memory system. The memory system may include a storage device including a plurality of dies in which data is stored, and a memory controller configured to control an operation of the storage device, wherein the dies store pieces of reliability grade information about the respective dies, and wherein the memory controller receives the pieces of reliability grade information from the dies, sets reference values for managing the dies depending on the received reliability grade information, and manages the respective dies based on the reference values.

An embodiment of the present disclosure may provide for a method of operating a memory system. The method may include, storing, in at least one of dies of the memory system, pieces of reliability grade information about the dies; storing and updating, in a memory controller of the memory system, a read count value, a program count value, and a number of free blocks as reference values for each of the dies for controlling the dies; receiving the reliability grade information from a die selected from among the dies, and selecting a reference value corresponding to the reliability grade information; and generating commands for managing the selected die based on the reliability grade information and the selected reference value.

An embodiment of the present disclosure may provide for a memory system. The memory system may include one or more memory devices each configured to store predetermined reliability information; and a memory controller configured to control each of the memory devices to perform a read reclaim operation based on the reliability information, wherein the reliability information of each memory device includes information on plural ranges of a cycled number and a plurality of trigger values respectively corresponding to the plural ranges, wherein the cycled number represents a number of operation times of a pair of erase and write operations performed to a memory block, and wherein the trigger value represents the cycled number to trigger the read reclaim operation to be performed to the memory block.

An embodiment of the present disclosure may provide for a memory system. The memory system may include one or more memory devices each configured to store predetermined trigger value information; and a memory controller configured to control each of the memory devices to perform a wear-leveling operation based on the trigger value information, wherein the trigger value information represents a number of operation times of a write operation performed to the memory device to trigger the wear-leveling operation to be performed to the memory device.

An embodiment of the present disclosure may provide for a memory system. The memory system may include one or more memory devices each configured to store predetermined trigger value information; and a memory controller configured to control each of the memory devices to perform a garbage collection operation based on the trigger value information, wherein the trigger value information represents a number of free blocks within the memory device to trigger the garbage collection operation to be performed to the memory device.

BRIEF DESCRIPTION OF THE DRAWINGS

FIG. 8 is a diagram illustrating an embodiment in which a storage device is managed depending on reliability grades.

FIGS. 11 and 12 are diagrams illustrating embodiments in which a storage device is managed depending on reliability grades.

DETAILED DESCRIPTION

Advantages and features of the present disclosure, and methods for achieving the same are enabled with reference to embodiments described below in detail together with the accompanying drawings. The present disclosure, however, is not limited to the following embodiments but may be embodied in other forms, which may be variations or modifications of any of the disclosed embodiments. As such, the following embodiments are provided so that the present disclosure is thorough and complete and fully conveys the technical spirit of the disclosure to those skilled in the art. Also, reference throughout the specification to "an embodiment," "another embodiment" or the like is not necessarily to only one embodiment, and different references to any such phrase are not necessarily to the same embodiment(s).

It is also noted that in this specification, "connected/coupled" refers to one component not only directly coupling another component but also indirectly coupling another component through one or more intermediate components. Communication between two components, whether directly or indirectly connected/coupled, may be wired or wireless, unless the context indicates otherwise. In the specification, when an element is referred to as "comprising" or "including" a component, it does not preclude another component but may further include one or more other components unless the context clearly indicates otherwise.

Figure 1:
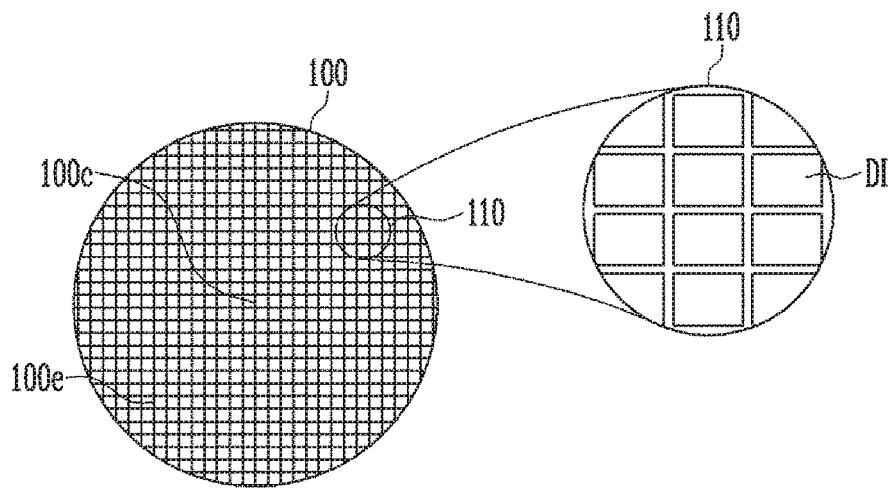
FIG. 1 is a diagram illustrating a wafer on which dies are formed.

FIG. 1 is a diagram illustrating a wafer on which dies are formed.

Referring to FIG. 1, a plurality of dies DI may be formed on a single wafer 100. As the degree of integration of dies is increased, the sizes of the dies may be decreased, and thus the number of dies DI formed on the wafer 100 may also be increased. Since the plurality of dies DI are formed on a single wafer, there may be differences between the electrical characteristics of the dies DI depending on the positions of formation of the dies DI on the wafer. When a portion of the wafer 100 is magnified (indicated by 110), the plurality of dies DI may be formed so that they are separated by scribe lanes as boundaries.

For example, various types of liquid and gas may be used to form the plurality of dies DI on the wafer 100, and a process such as polishing may be simultaneously performed on the entire wafer 100. Ideally, the same manufacturing process is performed on the dies DI manufactured on the wafer, in which case electrical characteristics of all dies DI should be identical to each other, but the amount of liquid or gas used in different regions in the wafer 100 may differ due to the characteristics of an actual manufacturing process. For example, liquid or gas may be uniformly used in a central region 100c of the wafer 100, but it may be non-uniformly used in an edge region 100e. Accordingly, the dies DI formed in the central region 100c of the wafer 100 may have better electrical characteristics and a lower error rate than those of the dies DI formed in the edge region 100e. For example, faults in which lines to be isolated from each other are shorted may occur more frequently in the dies DI formed in the edge region 100e than in the dies D1 in the central region 100c.

In the present embodiment, a memory system capable of managing the dies DI in accordance with the electrical characteristics of respective dies DI is provided.

Figure 2:
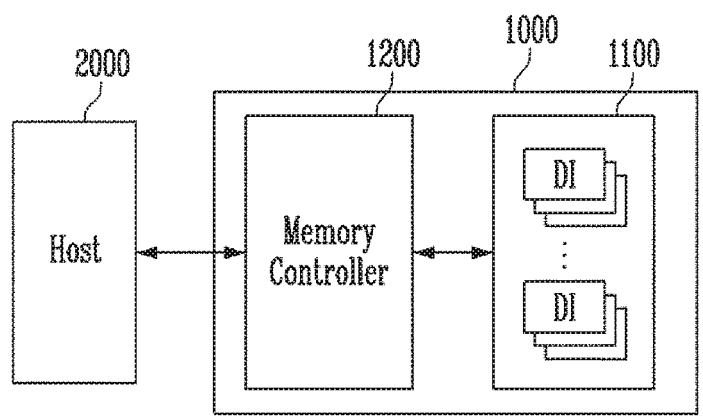
FIG. 2 is a diagram illustrating a memory system in accordance with an embodiment of the present disclosure.

FIG. 2 is a diagram illustrating a memory system in accordance with an embodiment of the present disclosure.

Referring to FIG. 2, a memory system 1000 may include a storage device 1100 which stores data, and a memory controller 1200 which controls the storage device 1100 in response to a request received from a host 2000.

The host 2000 may communicate with the memory system 1000 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), NonVolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The storage device 1100 may include a plurality of dies DI. The dies DI may store or output data under the control of the memory controller 1200. As described above with reference to FIG. 1, electrical characteristics of the dies DI in the storage device 1100 may differ from each other, and thus pieces of reliability grade information may be stored in the dies DI respectively. The reliability grade information for the corresponding die is indicative of its electrical characteristics. Such reliability grade information may be determined based on the results of a test operation performed on respective dies in a manufacturing process for the dies DI. In the present embodiment, the memory controller 1200 may individually manage respective dies DI. That is, each die may be managed based on the piece of reliability grade information stored in the corresponding die. Each of the dies DI may be implemented as a volatile memory device in which stored data is lost when the supply of power is interrupted or as a nonvolatile memory device in which stored data is retained even when the supply of power is interrupted.

The memory controller 1200 may control the overall operation of the memory system 1000, and may control data exchange between the host 2000 and the storage device 1100. The memory controller 1200 may be coupled to the storage device 1100 through a channel CH, and may transmit commands, addresses, and data through the channel CH. For example, the memory controller 1200 may transmit a command for performing a program operation, a read operation or an erase operation to the storage device 1100 through the channel CH in response to a request received from the host 2000. The memory controller 1200 may receive the reliability grade information from the dies DI in the storage device 1100, and may variably manage the dies DI based on the reliability grade information and the number of cycling operations of the dies DI.

The memory controller 1200 controls each of memory devices in the storage device 1100 to perform a read reclaim operation based on the reliability grade information, wherein the reliability information of each of the memory device includes information on plural ranges of a cycled number and a plurality of trigger values respectively corresponding to the plural ranges. The cycled number represents a number of operation times of a pair of erase and write operations performed to an each of memory blocks in the memory device. The trigger value represents the cycled number to trigger the read reclaim operation to be performed to the memory blocks, or a number of operation times of a write operation performed to the memory device to trigger a wear-leveling operation to be performed to the memory device, or a number of free memory blocks within the memory device to trigger a garbage collection operation to be performed to the memory device.

Figure 3A:
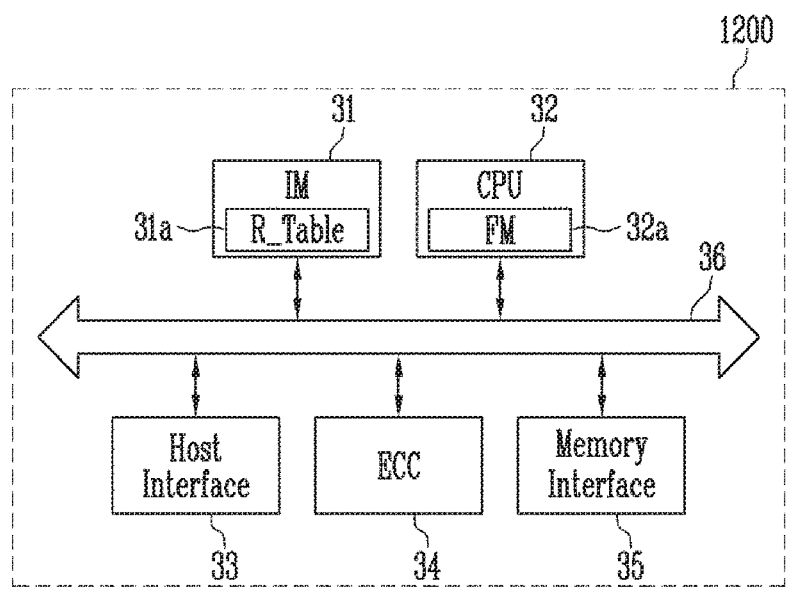
FIG. 3A is a diagram illustrating a memory controller in accordance with an embodiment of the present disclosure.

FIG. 3A is a diagram illustrating a memory controller in accordance with an embodiment of the present disclosure.

Referring to FIG. 3A, a memory controller 1200 may include an Internal Memory (IM) 31, a Central Processing Unit (CPU) 32, a host interface 33, an Error Correction Circuit (ECC) 34, and a memory interface 35 in order to perform communication between a host 2000 and a storage device 1100.

The internal memory 31, the CPU 32, the host interface 33, the error correction circuit 34, and the memory interface 35 may communicate with each other through a bus 36.

The internal memory 31 may store various types of system information required for the operation of a memory system 1000. For example, the internal memory 31 may store address information or the like required for the operation of the memory system 1000. The internal memory 31 may be implemented as any of a Random Access Memory such as a Static RAM (SRAM), a Dynamic RAM (DRAM), a Phase-Change RAM (PCRAM or PRAM), a Spin-Transfer Torque (STT)-RAM, or a Resistive RAM (ReRAM). For example, the internal memory 31 may include a Double Data Rate Synchronous DRAM (DDR SDRAM), a DDR fourth generation SDRAM (DDR4 SDRAM), a Low Power DDR fourth generation (LPDDR4) SDRAM, a Graphics Double Data Rate (GDDR) SDRAM, a LPDDR SDRAM, or a Rambus DRAM (RDRAM).

In accordance with the present embodiment, the internal memory 31 may include a reliability table (R_Table) 31a in which pieces of reliability information about respective dies DI are stored and updated. The reliability table 31a may store pieces of information about various cycling periods and reference values respectively corresponding to the pieces of cycling period information. Here, the term "cycling" means a unit by which an erase operation and a program operation are each performed once on a die DI. For example, when one erase operation is performed and one program operation are performed on a single die DI, the number of cycling operations of the corresponding die DI is increased by '1'. Further, the reliability table 31a may store various types of information including a read count value, a program count value, and the number of free blocks (i.e., a free block number), in addition to the cycling period information.

The original of information included in the reliability table 31a may be stored in the dies DI, and the information of the reliability table 31a, stored in the dies DI, may be transmitted to the internal memory 31 when the memory system 1000 boots. The information of the reliability table 31a, transmitted to the internal memory 31, may be updated by the CPU 32 during the operation of the memory system 1000.

The CPU 32 may perform various operations for controlling the storage device 1100 or may generate various commands. For example, when a request is received from the host 2000, the CPU 32 may generate commands in response to the received request. Further, although a request is not received from the host 2000, the CPU 32 may generate commands for internal operations for managing the storage device 1100, and may control the internal memory 31, the host interface 33, the error correction circuit 34, and the memory interface 35 in response to the generated commands.

Further, the CPU 32 may include Firmware Memory (FM) 32a in which firmware which is software capable of controlling various operations is stored. Further, the firmware may also be stored in the storage device 1100 or in the internal memory 31.

In accordance with the present embodiment, the firmware stored in the firmware memory 32a may perform a reliability management operation. For example, the firmware may control the reliability table 31a so that, whenever a request for a program operation or an erase operation on each die DI is received, the number of cycling operations is updated, and may set various reference values for managing each die DI depending on the reliability grade information and the number of cycling operations of each die DI. Therefore, the CPU 32 may generate commands for controlling the storage device 1100 based on the reference values calculated by the firmware. For example, the CPU 32 may perform a read reclaim operation, a wear leveling operation or a garbage collection operation depending on the reference values of respective dies DI calculated by the firmware.

The host interface 33 may exchange commands, addresses, and data between the memory controller 1200 and the host 2000. The host interface 33 may communicate with the host 2000 using a protocol such as a Peripheral Component Interconnect-express (PCI-e), Advanced Technology Attachment (ATA), Serial ATA (SATA), Parallel ATA (PATA), Serial Attached SCSI (SAS) or Nonvolatile Memory express (NVMe) protocol. The host interface 33 is not limited to the above-described examples, and may include various interfaces, such as Universal Serial Bus (USB), Multi-Media Card (MMC), Enhanced Small Disk Interface (ESDI), or Integrated Drive Electronics (IDE) interfaces.

The error correction circuit 34 may encode data received from the host (e.g., 2000 of FIG. 2) during a program operation, and may decode data received from the storage device 1100 during a read operation. Further, during a read operation, the error correction circuit 34 may output a fail signal when the number of error bits detected from read data is greater than the allowable number of bits, and may correct detected error bits when the number of error bits detected is less than the allowable number of bits.

The memory interface 35 may exchange commands, addresses, and data between the memory controller 1200 and the storage device 1100. For example, the memory interface 35 may transmit commands, addresses, and data to the storage device 1100 through the channel, and may receive data or the like from the storage device 1100.

Figure 3B:
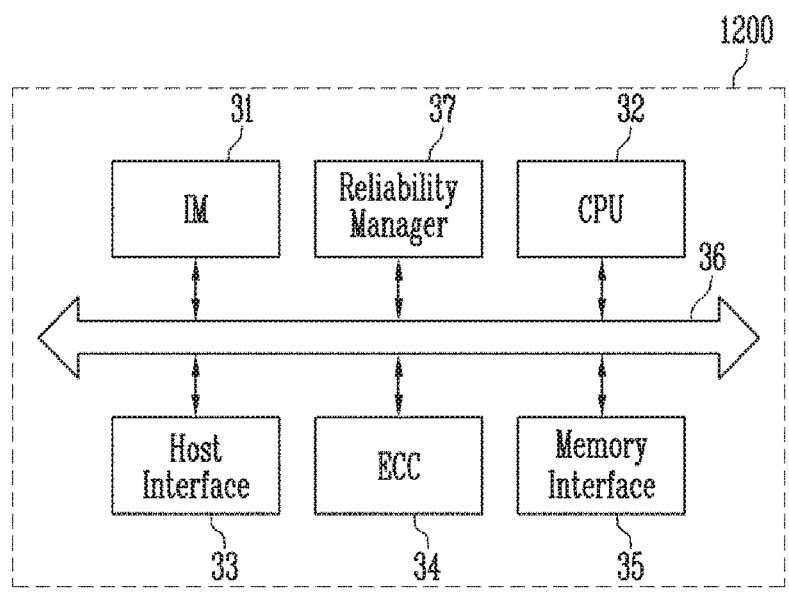
FIG. 3B is a diagram illustrating a memory controller in accordance with an embodiment of the present disclosure.

FIG. 3B is a diagram illustrating a memory controller, e.g., memory controller 1200, in accordance with an embodiment of the present disclosure.

Referring to FIG. 3B, the memory controller 1200 may separately include a reliability manager 37, which may be implemented as a hardware component, and which performs a reliability management operation and an operation of storing and updating the reliability information. That is, some functions of firmware described above in FIG. 3A, that is, a reliability management operation and an operation of storing and updating reliability information, stored in the internal memory 31, may be performed by the reliability manager 37. In FIG. 3B, description of the elements 31 to 36, which are identical to those of FIG. 3A, is omitted; the reliability manager 37 is described below.

The reliability manager 37 may receive pieces of reliability grade information from respective dies DI, and may update the number of requests whenever a request for a program operation or an erase operation on each die DI is received. For example, the reliability manager 37 may update the number of cycling operations in the erase and program operations performed on each die DI. Further, the reliability manager 37 may store and update various types of information including a read count value, a program count value, a free block number, etc., in addition to the number of cycling operations.

The reliability manager 37 may control a read reclaim operation, a wear-leveling operation, and a garbage collection operation by using the reliability grade information, the number of cycling operations, the read count value, the program count value, the free block number, etc. as reference values.

The read reclaim operation refers to the operation of copying or moving, when the number of read operations performed on the die DI reaches a set number, data between memory blocks included in the same die so as to prevent the reliability of data stored in the die DI from being deteriorated. A wear-leveling operation refers to an operation of distributing addresses so that a program operation is not excessively performed on a specific die or block. A garbage collection operation refers to an operation of copying and collecting, when the number of free blocks becomes less than a set number, valid pages in a specific block, and erasing existing blocks, in which the valid pages were included, thus increasing the number of free blocks.

Therefore, a reference value for performing the read reclaim operation may be the number of read operations (i.e., read count value) performed on the die DI, a reference value for performing the wear-leveling operation may be the number of program operations (i.e., program count value) performed on the die, and a reference value for performing the garbage collection operation may be the number of free blocks (i.e., free block number).

The reliability manager 37 may manage the reference values for performing the read reclaim operation, the wear-leveling operation or the garbage collection operation so that the reference values are set to different values for respective dies DI, based on the reliability grade information and various types of information.

Figure 4:
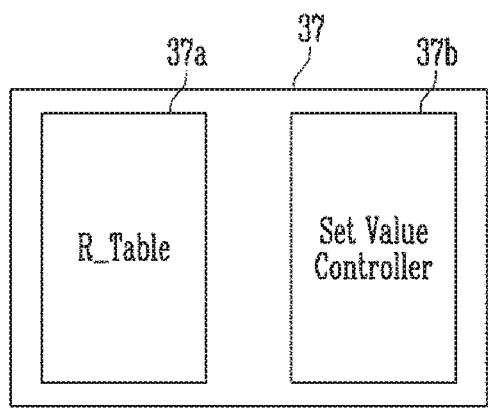
FIG. 4 is a diagram illustrating a reliability manager such as that of FIG. 3B.

FIG. 4 is a diagram illustrating a reliability manager such as that of FIG. 3B.

Referring to FIG. 4, the reliability manager 37 may include a reliability table (R_Table) 37a and a set value controller 37b.

In the reliability table 37a, pieces of information about various cycling periods depending on pieces of reliability grade information and reference values respectively corresponding to the pieces of cycling period information may be stored. Here, the reference values may include a read reclaim reference value. For example, the read reclaim reference value may include a read count value indicating whether and when to perform a read reclaim operation. The read reclaim reference value may further include a program count value and the number of free blocks (i.e., free block number) in addition to the read count value. Hereinafter, an example in which the read reclaim reference value is used as the reference value will be described, but the following description may also be applied to the setting of a wear-leveling reference value or a garbage collection reference value. Further, in addition to the above-described embodiment, the reference values may be values indicating times at which various internal operations of managing the storage device 1100 are to be executed.

The set value controller 37b may perform a reliability management operation. For example, the set value controller 37b may receive reliability grade information from a selected die DI, and may select a reference value for performing the internal operation of the selected die DI corresponding to the reliability grade information. For example, the set value controller 37b may select a reference value corresponding to a period including the current number of cycling operations, among the cycling periods of the selected die DI. The set value controller 37b may be operated under the control of the CPU 32. For example, the set value controller 37b may perform a reliability management operation when a reliability management signal is enabled by the CPU 32.

The reference value selected from the reliability table 37a may be transmitted to the CPU 32 under the control of the set value controller 37b, and the CPU 32 may determine whether to perform an internal operation based on the received reference value, and may generate commands required for the internal operation when it is determined to perform the internal operation.

Figure 5:
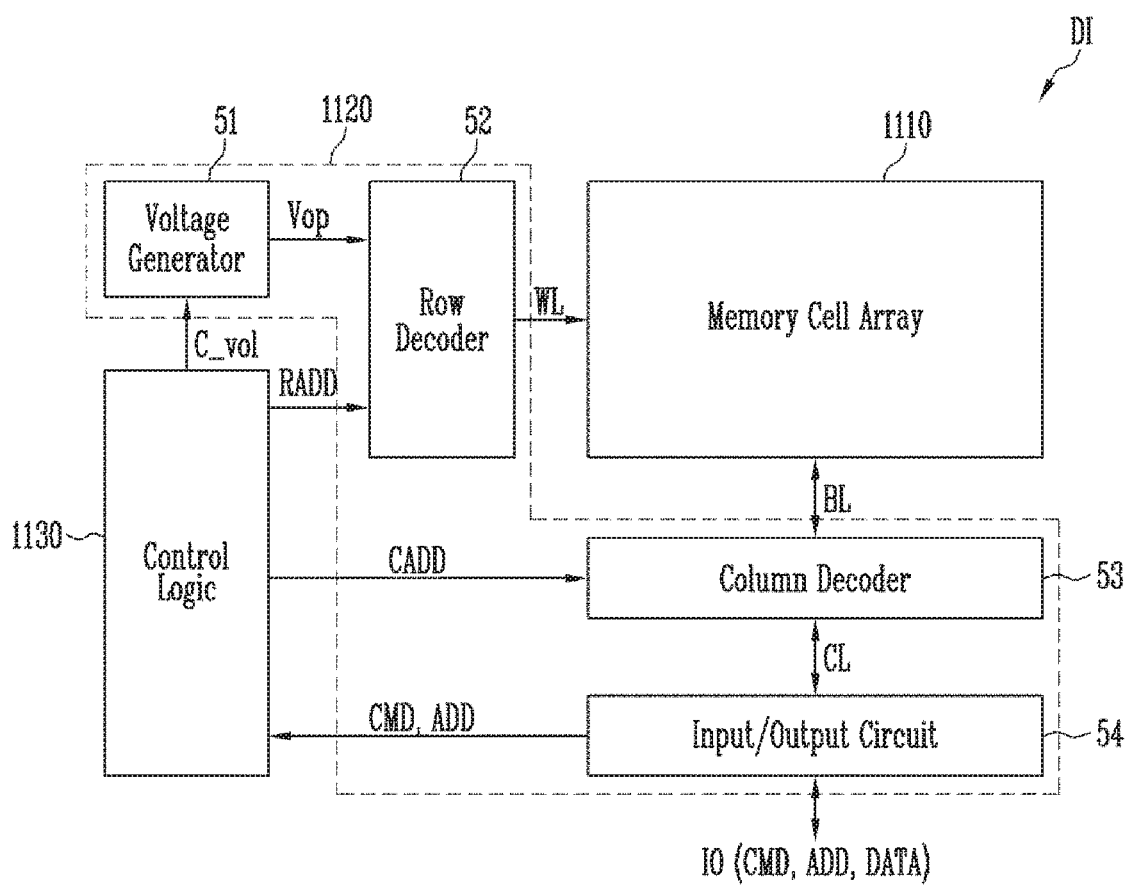
FIG. 5 is a diagram illustrating dies such as those of FIG. 2.

FIG. 5 is a diagram illustrating dies DI of FIG. 2.

Since each of the dies DI in which data is stored may be configured to have the same structure, any one die DI is illustrated in FIG. 5 and is described by way of example.

Referring to FIG. 5, the die DI may be implemented as any of various types of storage mediums including a volatile memory or a nonvolatile memory. For example, when the die DI is implemented as a volatile memory device, the memory device may include a Dynamic Random Access Memory (DRAM), a Static RAM (SRAM), a Thyristor RAM (TRAM), a Zero capacitor RAM (Z-RAM), a Twin transistor RAM (TTRAM), a Magnetoresistive (MRAM), an Unbuffered Dual In-Line Memory Module (UDIMM), a Registered DIMM (RDIMM), a Load Reduced DIMM (LRDIMM), or a Non-Volatile DIMM (NVDIMM). When the die DI is implemented as a nonvolatile memory device, the memory device may include an Electrically Erasable Programmable Read-Only Memory (EEPROM), a flash memory, a Magnetic RAM (MRAM), a Spin-Transfer Torque MRAM (STT-MRAM), a Conductive Bridging RAM (CBRAM), a Ferroelectric RAM (FeRAM), a Phase-change RAM (PRAM), a Resistive RAM (RRAM), a nanotube RRAM, a Polymer RAM (PoRAM), a Nano Floating Gate Memory (NFGM), a holographic memory, a molecular electronics memory, or an insulator resistance change memory.

The above-described DI may perform various operations in response to the commands output from the memory controller 1200. For this, the die DI may include a memory cell array 1110 which stores data, peripheral circuits 1120, and a control logic 1130.

The memory cell array 1110 may include a plurality of memory cells which store data. For example, the memory cell array 1110 may include a plurality of memory blocks, each of which may include a plurality of memory cells. Some of the memory blocks may store reliability grade information about the die DI. In detail, the reliability grade information about the die DI including the memory blocks may be stored in some memory blocks of the corresponding die DI.

The peripheral circuits 1120 may include a voltage generator 51, a row decoder 52, a column decoder 53, and an input/output circuit 54.

The voltage generator 51 may generate and output operating voltages Vop having various levels depending on a voltage generation code C_vol output from the control logic 1130. For example, the voltage generator 51 may output a program voltage, a read voltage, an erase voltage, and a pass voltage as the operating voltages Vop.

The row decoder 52 may transfer the operating voltages Vop to a selected memory block in response to a row address RADD output from the control logic 1130.

The column decoder 53 may exchange data with bit lines BL coupled to the memory cell array 1110 in response to a column address CADD output from the control logic 1130.

The input/output circuit 54 may be coupled to the memory controller 1200 through input/output lines JO to receive a command CMD and an address ADD from the memory controller 1200 and to input/output data from/to the memory controller 1200. For example, the input/output circuit 54 may receive the command CMD and the address ADD from the memory controller 1200, and may transfer the command CMD and the address ADD to the control logic 1130. Furthermore, the input/output circuit 54 may transmit data DATA, received from the memory controller 1200, to the column decoder 53 through column lines CL, or may output the data DATA, received through the column lines CL, to the memory controller 1200 through the input/output lines IO. For example, the reliability grade information stored in some memory blocks may be output as the data DATA to the memory controller 1200.

The reliability management operation performed by the above-described devices is described below with reference to FIGS. 6 to 9.

Figure 6:
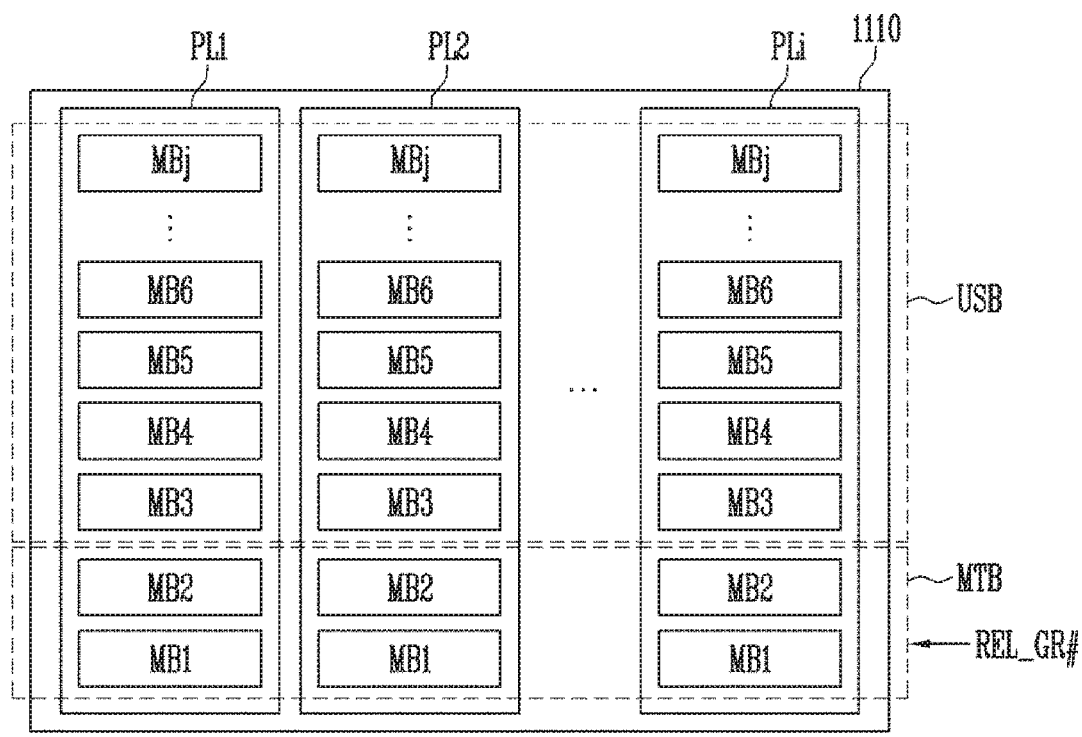
FIG. 6 is a diagram illustrating a memory cell array such as that of FIG. 5.

FIG. 6 is a diagram illustrating the memory cell array of FIG. 5.

Referring to FIG. 6, reliability grade information REL_GR# may be stored in the memory cell array 1110, and the reliability grade information REL_GR#, stored in the memory cell array 1110, may be transmitted to a memory controller (e.g., 1200 of FIG. 2) in response to a request from the memory controller 1200. The reliability grade information REL_GR# may be information about the reliability grade of the die DI including the memory cell array 1110, and may be stored in any one of first to j-th memory blocks MB1 to MBj after a manufacturing process for the die DI. The memory cell array 1110 in which the reliability grade information REL_GR# is stored will be described in detail below.

The memory cell array 1110 may include a plurality of planes PL1 to PLi (where i is a positive integer). For example, the first to i-th planes PL1 to PLi may individually store data under the control of the peripheral circuits 1120.

Each of the first to i-th planes PL1 to PLi may include first to j-th memory blocks MB1 to MBj. Each of the first to j-th memory blocks MB1 to MBj may include a plurality of memory cells. Some of the first to j-th memory blocks MB1 to MBj may be used as user blocks (USB) in which user data is stored, and other memory blocks may be used as meta-blocks (MTB) in which system data is stored.

In the meta-blocks, various types of system data such as address information may be stored and, in addition, the reliability grade information REL_GR# may be stored. Also, the meta-blocks (MTB) may include a Content Addressable Memory (CAM) block, and the reliability grade information REL_GR# may be stored in the CAM block. The CAM block may have a comparison function of detecting whether externally input data is identical to internally retained data, in addition to an original memory storage function of retaining data, and may also be used to store an address translation table.

Figure 7:
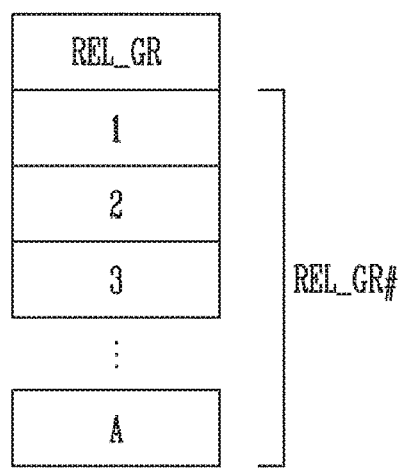
FIG. 7 is a diagram for explaining reliability grade information stored in a meta-block such as that of FIG. 6.

FIG. 7 is a diagram for explaining reliability grade information stored in a meta-block of FIG. 6.

Referring to FIG. 7, the reliability grade information REL_GR# may be stored based on the results of a test operation performed after a manufacturing process for dies DI, or may be stored depending on the positions of dies on a wafer.

When the reliability grade information REL_GR# is stored based on the test operation, various test operations, such as a test program operation, a test read operation, and a test erase operation, may be performed. The reliability grade information REL_GR# may be determined depending on the number of error bits detected during the test operation. For example, a lower grade (i.e., grade close to 1) may be assigned as the number of error bits is smaller, whereas a higher grade (i.e., grade close to A, where A is a positive integer) may be assigned as the number of error bits is larger.

When the reliability grade information REL_GR# is stored depending on the positions of dies DI on the wafer, a lower grade (i.e., grade close to 1) may be assigned as the position of a die DI is closer to the center of the wafer, whereas a higher grade (i.e., grade close to A) may be assigned as the position of a die DI is closer to the edge of the wafer.

For example, depending on the reliability grades of dies, a reliability grade REL_GR of '1' may be assigned to a meta-block MTB of a first die, and a reliability grade REL_GR of '3' may be assigned to a meta-block MTB of a second die.

In the above-described embodiment, as the reliability is higher, lower reliability grade information REL_GR# has been assigned, whereas as the reliability is lower, higher reliability grade information REL_GR# has been assigned, but the reliability grades may be assigned in a way opposite to this.

The reliability grade information REL_GR#, stored in the meta-block MTB, may be output to the memory controller 1200 when the memory controller 1200 performs a reliability management operation. The memory controller 1200 may allow the received reliability grade information REL_GR# and the current number of cycling operations of each die to correspond to a reliability table (e.g., 31a of FIG. 3A or 37a of FIG. 4), and may generate commands for controlling the storage device 1100 based on a reference value selected from the reliability table 31a or 37a.

A method of selecting a reference value from the reliability table 31a or 37a is described below.

FIG. 8 is a diagram illustrating an embodiment for managing a storage device, e.g., storage device 1100, depending on reliability grades.

Referring to FIG. 8, in the reliability table (e.g., 31a of FIG. 3A or 37a of FIG. 4) of the memory controller 1200, various types of cycling period information EWC and reference values RR corresponding to respective pieces of cycling period information EWC may be stored. In FIG. 8, for better understanding of the present embodiment, a read reclaim operation will be described below.

The cycling period information EWC may denote the number of pairs of erase and write operations performed on each memory block. The reference values RR may be differently set to correspond to respective pieces of cycling period information EWC. Therefore, the set value controller (e.g., 37b of FIG. 4) may continuously update (indicated by reference number 81 in FIGS. 8, 9, 11 and 12) the cycling period information EWC to precisely detect, within the reliability table 31a or 37a, the cycling period information EWC corresponding to the cycling period of each die DI, as the operation of each die DI progresses.

That is, the reference value RR of a selected memory block within the selected die DI may be determined depending on the reliability grade information REL_GR# of the selected die DI and the cycling period information EWC of the selected memory block, and a read reclaim operation may be performed to the selected memory block based on the determined reference value RR. Since the reliability grade information REL_GR# of the selected die DI may be fixed information, and the cycling period information EWC of the selected memory block may vary with the operation of the die DI, the reference value RR of the selected memory block required to perform the read reclaim operation to the selected memory block may also vary depending on the reliability grade information REL_GR# of the selected die DI and the cycling period information EWC of the selected memory block within the selected die DI.

In an example, assuming that the reliability grade information REL_GR# received from the selected die DI is '1', and the cycling period information EWC of a memory block selected from among memory blocks in the selected die DI is 0.4 k to 3 k, the reference value RR required for the read reclaim operation on the selected memory block may be set to 350 k. That is, when a read operation is performed 350 k times corresponding to the reference value RR on the selected memory block in the selected die DI, the read reclaim operation may be performed on the selected memory block. Here, the unit 'k' denotes 1000 times. Therefore, reference values RR may differ for respective memory blocks even in the selected die DI. However, since the pieces of reliability grade information REL_GR# of the memory blocks included in the selected die DI are equal to each other, the reference values RR may be set to different values depending on the pieces of cycling period information EWC of respective memory blocks. The set value controller 37b may output the reference values RR, set in the reliability table 31a or 37a, to the CPU (indicated by reference number 82 in FIGS. 8, 9, 11 and 12).

In an example, even if pieces of cycling period information EWC of respective memory blocks included in different dies DI are equal to each other, reference values RR may be different from each other when pieces of reliability grade information REL_GR# of the dies DI are different from each other. For example, even if pieces of cycling period information of a selected memory block in a first die (i.e., REL_GR=1) and a selected memory block in a second die (i.e., REL_GR=2) are equal to each other (6.1 k to 9 k), the reference value RR of the selected memory block in the first die may be set to 250 k but the reference value RR of the selected memory block in the second die may be set to 200 k. In FIG. 8, 'A' may be a positive integer of more than 2, and 'BB' may be a positive integer of less than 45.

In this way, the pieces of cycling period information EWC and the reference values RR stored in the reliability table 31a or 37a may differ depending on the memory system 1000.

Figure 9:
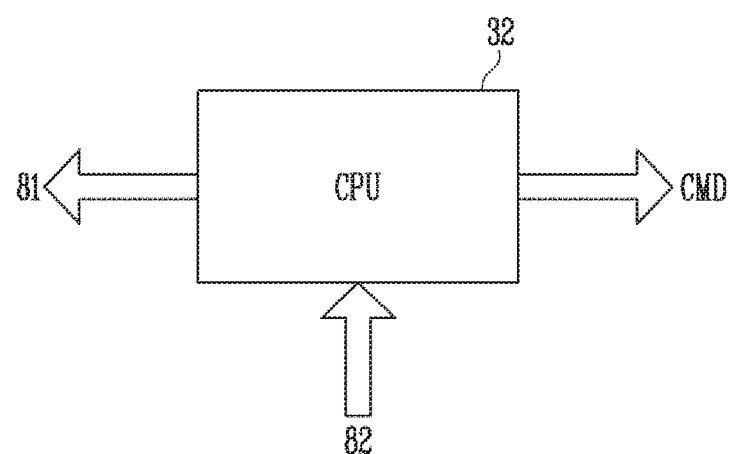
FIG. 9 is a diagram illustrating a method of operating a central processing unit in accordance with an embodiment of the present disclosure.

FIG. 9 is a diagram illustrating a method of operating a central processing unit (CPU), e.g., CPU 32, in accordance with an embodiment of the present disclosure.

Referring to FIG. 9, the CPU 32 may transmit cycling period information of a selected memory block in a selected die to the reliability table 31a or 37a and may generate a command CMD based on the reference value RR output from the reliability table 31a or 37a. For example, the CPU 32 may generate and output a command CMD for performing a read reclaim operation on the selected memory block based on the reference value RR during an internal operation of the memory system 1000.

Figure 10:
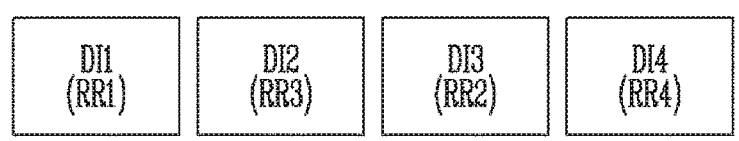
FIG. 10 is a diagram illustrating an embodiment in which dies are managed by individually applying references to respective dies.

FIG. 10 is a diagram illustrating an embodiment in which dies DI are managed by individually applying references to respective dies DI.

Referring to FIG. 10, in accordance with embodiments described above with reference to FIGS. 1 to 9, reference values RR1 to RR4 may be differently set depending on the reliability grade information REL_GR# for respective dies DI1 to DI4 and cycling period information EWC for a memory block within each of the dies DI1 to DI4. Therefore, the CPU 32 may differently manage read reclaim operations on the dies DI1 to DI4 and memory blocks in the respective dies based on the different reference values RR1 to RR4.

Figure 12:
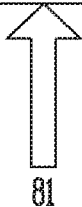
Figure 12:
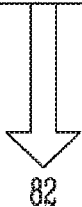

FIGS. 11 and 12 are diagrams illustrating embodiments in which a storage device, e.g., storage device 1100, is managed depending on the reliability grades. More specifically, FIG. 11 illustrates an embodiment of a wear-leveling management method depending on the reliability grades, and FIG. 12 illustrates an embodiment of a garbage collection management method depending on the reliability grades.

Referring to FIG. 11, a wear-leveling operation may be performed depending on the reliability grade information REL_GR# and the program count value PGM_C of each die. In an embodiment, a lower value of the reliability grade REL_GR of a die may represent higher reliability grade of the die. For example, wear leveling may be controlled such that, as the reliability grade of a certain die is higher, the certain die is more frequently selected during a program operation. For example, it is assumed that the reliability grade REL_GR of the first die DI1 is a first grade and the current program count value of the first die DI1 is C1 and that the reliability grade REL_GR of the second die DI2 is a second grade and the current program count value of the second die DI2 is C4. When the values of C1 and C4 are equal to each other, the first die DI1 may be selected in preference to the second die DI2 during a program operation. When the value of C1 is greater than that of C4, the second die DI2 may be selected in preference to the first die DI1 during a program operation. This operation is an embodiment. In another embodiment, the dies may be selected by comparing the reliability grades REL_GR and the program count values of respective dies using various methods during a program operation.

Referring to FIG. 12, garbage collection may be performed depending on the reliability grades REL_GR and free block numbers FBN of respective dies. For example, in dies DI1, DI3, and DI4, each having a first reliability grade, when the free block number FBN is less than or equal to 2, garbage collection may be performed. In dies DI2, DI5, and DI6, each having a second reliability grade, when the free block number FBN is less than or equal to 4, garbage collection may be performed. In dies DI8, DI12, and DI14, each having a third reliability grade, when the free block number FBN is less than or equal to 6, garbage collection may be performed. That is, as the reliability grade is higher, a reference value for the free block number may be lower, whereas when the reliability grade is lower, the reference value for the free block number may be higher. Therefore, garbage collection may be more frequently performed on a block having a lower reliability grade.

Figure 13:
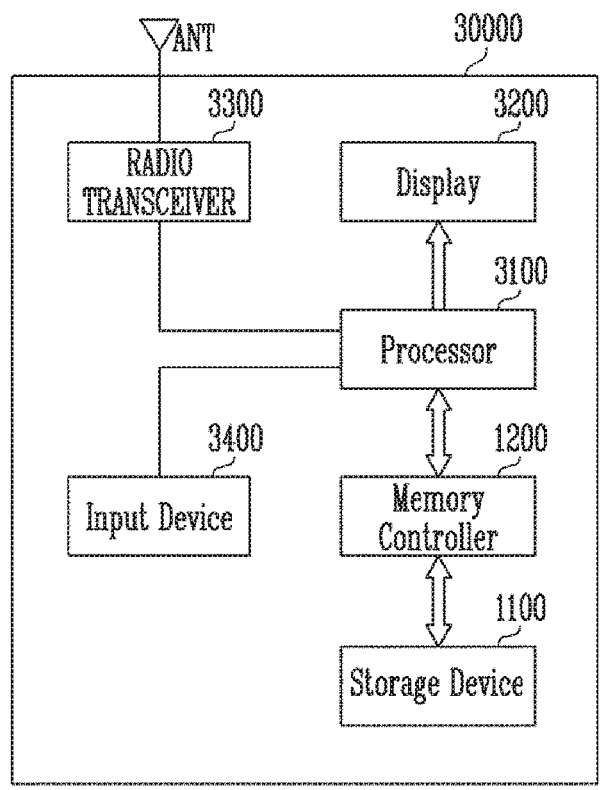
FIG. 13 is a diagram illustrating an embodiment of the memory system such as that of FIG. 2.

FIG. 13 is a diagram illustrating an embodiment of a memory system such as that of FIG. 2.

Referring to FIG. 13, a memory system 30000 may be implemented as a cellular phone, a smart phone, a tablet PC, a personal digital assistant (PDA) or a wireless communication device. The memory system 30000 may include a storage device 1100 and a memory controller 1200 that is capable of controlling the operation of the storage device 1100. The memory controller 1200 may control a data access operation for the storage device 1100, for example, a program operation, an erase operation or a read operation under the control of a processor 3100.

Data programmed to the storage device 1100 may be output via a display 3200 under the control of the memory controller 1200.

A radio transceiver 3300 may exchange radio signals through an antenna ANT. For example, the radio transceiver 3300 may convert a radio signal received through the antenna ANT into a signal which may be processed in the processor 3100. Therefore, the processor 3100 may process a signal output from the radio transceiver 3300 and transmit the processed signal to the memory controller 1200 or the display 3200. The memory controller 1200 may transmit the signal processed by the processor 3100 to the storage device 1100. Furthermore, the radio transceiver 3300 may convert a signal output from the processor 3100 into a radio signal, and output the changed radio signal to an external device through the antenna ANT. An input device 3400 may be used to input a control signal for controlling the operation of the processor 3100 or data to be processed by the processor 3100. The input device 3400 may be implemented as a pointing device such as a touch pad or a computer mouse, a keypad or a keyboard. The processor 3100 may control the operation of the display 3200 such that data output from the memory controller 1200, data output from the radio transceiver 3300, or data output from the input device 3400 is output via the display 3200.

In an embodiment, the memory controller 1200 capable of controlling the operation of the storage device 1100 may be implemented as a part of the processor 3100 or a chip provided separately from the processor 3100.

Figure 14:
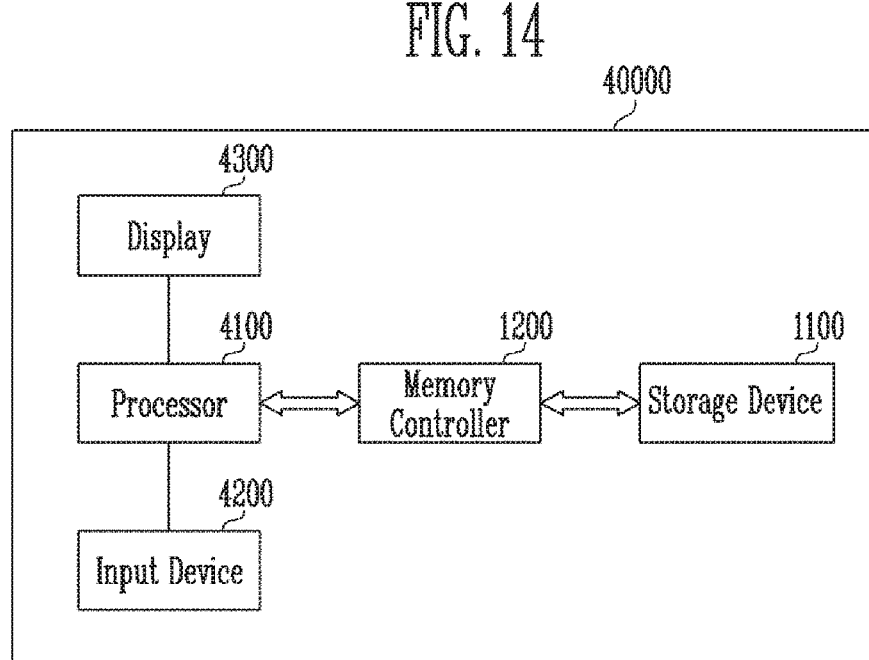
FIG. 14 is a diagram illustrating an embodiment of a memory system including a memory controller such as that of FIG. 2.

FIG. 14 is a diagram illustrating an embodiment of a memory system including a memory controller such as that of FIG. 2.

Referring to FIG. 14, a memory system 40000 may be embodied in a personal computer, a tablet PC, a net-book, an e-reader, a personal digital assistant (PDA), a portable multimedia player (PMP), an MP3 player, or an MP4 player.

The memory system 40000 may include a storage device 1100 and a memory controller 1200 that is capable of controlling a data processing operation of the storage device 1100.

A processor 4100 may output data stored in the storage device 1100 via a display 4300 according to data input from an input device 4200. For example, the input device 4200 may be implemented as a pointing device such as a touch pad or a computer mouse, a keypad or a keyboard.

The processor 4100 may control the overall operation of the memory system 40000 and control the operation of the memory controller 1200. In an embodiment, the memory controller 1200 capable of controlling the operation of the storage device 1100 may be implemented as a part of the processor 4100 or a chip provided separately from the processor 4100.

Figure 15:
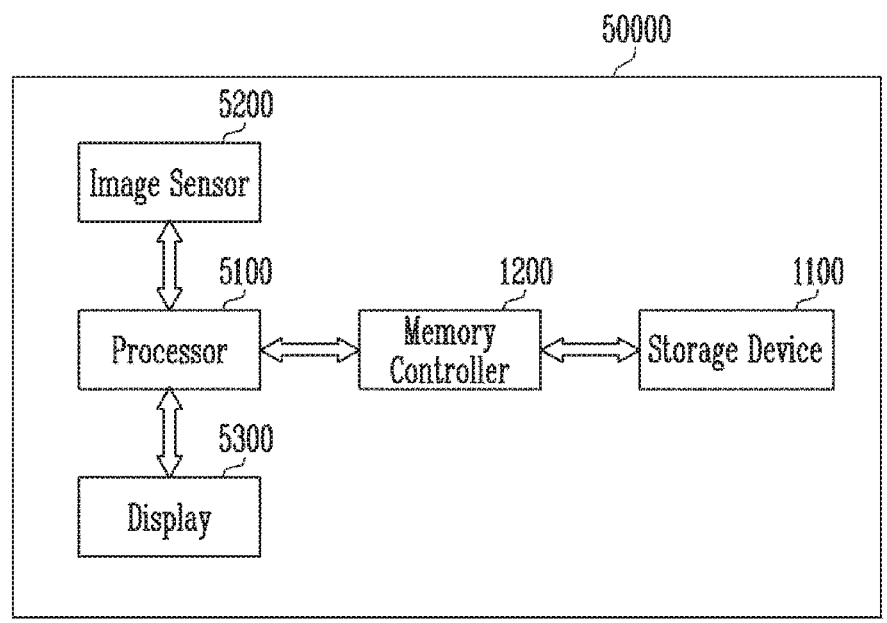
FIG. 15 is a diagram illustrating an embodiment of the memory system such as that of FIG. 2.

FIG. 15 is a diagram illustrating an embodiment of a memory system such as that of FIG. 2.

Referring to FIG. 15, a memory system 50000 may be embodied in an image processing device, e.g., a digital camera, a mobile phone provided with a digital camera, a smartphone provided with a digital camera, or a tablet PC provided with a digital camera.

The memory system 50000 may include a storage device 1100 and a memory controller 1200 that is capable of controlling a data processing operation of the storage device 1100, e.g., a program operation, an erase operation or a read operation.

An image sensor 5200 of the memory system 50000 may convert an optical image into digital signals. The converted digital signals may be transmitted to a processor 5100 or the memory controller 1200. Under the control of the processor 5100, the converted digital signals may be output via a display 5300 or stored in the storage device 1100 through the memory controller 1200. Data stored in the storage device 1100 may be output via the display 5300 under the control of the processor 5100 or the memory controller 1200.

In an embodiment, the memory controller 1200 capable of controlling the operation of the storage device 1100 may be implemented as a part of the processor 5100, or a chip provided separately from the processor 5100.

Figure 16:
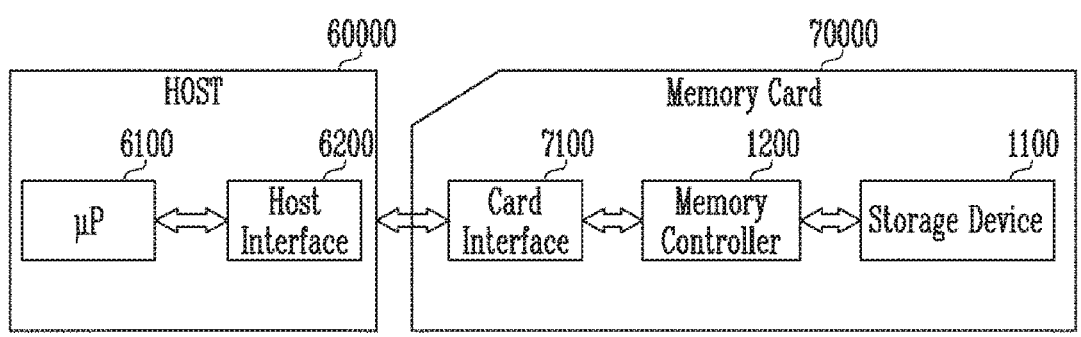
FIG. 16 is a diagram illustrating an embodiment of the memory system such as that of FIG. 2.

FIG. 16 is a diagram illustrating an embodiment of a memory system such as that of FIG. 2.

Referring to FIG. 16, a memory system 70000 may be embodied in a memory card or a smart card. The memory system 70000 may include a storage device 1100, a memory controller 1200, and a card interface 7100.

The memory controller 1200 may control data exchange between the storage device 1100 and the card interface 7100. In an embodiment, the card interface 7100 may be, but is not limited to, a secure digital (SD) card interface or a multi-media card (MMC) interface.

The card interface 7100 may interface data exchange between a host 60000 and the memory controller 1200 according to a protocol of the host 60000. In an embodiment, the card interface 7100 may support a universal serial bus (USB) protocol and an inter-chip (IC)-USB protocol. Here, the card interface may refer to hardware capable of supporting a protocol which is used by the host 60000, software installed in the hardware, or a signal transmission method.

When the memory system 70000 is coupled to a host interface 6200 of the host 60000, such as a PC, a tablet PC, a digital camera, a digital audio player, a mobile phone, console video game hardware or a digital set-top box, the host interface 6200 may perform data communication with the storage device 1100 through the card interface 7100 and the memory controller 1200 under the control of a microprocessor (μP) 6100.

In embodiments of the present disclosure, information about the electrical characteristics of dies in respective dies of a memory system, and may allow a memory controller which controls the dies to control the respective dies based on the information stored in the dies, thus improving the reliability of the memory system.

While various embodiments of the present disclosure have been illustrated and described, those skilled in the art will appreciate in light of the present disclosure that various modifications, additions and substitutions are possible. Therefore, the scope of the present disclosure is defined by the appended claims and equivalents of the claims rather than by the description preceding them.

What is claimed is:

1. A memory system, comprising:
a storage device including a plurality of dies in which data is stored; and
a memory controller configured to control an operation of the storage device, wherein the dies store pieces of reliability grade information about the respective dies, wherein the memory controller receives the pieces of reliability grade information from the dies, sets reference values for managing the dies depending on the received reliability grade information, and manages the respective dies based on the reference values, and wherein the memory controller comprises:
- a reliability table configured to store the pieces of reliability grade information and the reference values respectively corresponding to the pieces of reliability grade information; and
- a set value controller configured to receive the pieces of reliability grade information from the dies and select the reference values for managing the dies from the reliability table using the received reliability grade information.

2. The memory system according to claim 1, wherein the reliability grade information is determined based on results of a test operation or determined depending on positions of the dies on a wafer.

3. The memory system according to claim 1, wherein the reliability grade information is stored in at least one of the dies.

4. The memory system according to claim 2, wherein, when the reliability grade information is determined based on the test operation, the reliability grade information is determined depending on a number of error bits detected in the test operation.

5. The memory system according to claim 2, wherein, when the reliability grade information is determined depending on the positions of the dies on the wafer, the reliability grade information is determined depending on the positions of the dies as manufactured on the wafer.

6. The memory system according to claim 1, wherein:
- a read reclaim operation is performed using each of the reference values as a read count value,
- a wear-leveling operation is performed using each of the reference values as a program count value, or
- a garbage collection operation is performed using each of the reference values as a number of free blocks.

7. The memory system according to claim 6, wherein the reference value for the read reclaim operation is set to a higher value as a reliability grade is higher.

8. The memory system according to claim 6, wherein, when the reference values are equal to each other in dies having different reliability grades, the wear-leveling operation is preferentially performed on a die having a higher reliability grade.

9. The memory system according to claim 6, wherein the reference value for the garbage collection operation is set to a lower value as a reliability grade is higher.

10. The memory system according to claim 1, wherein the memory controller further comprises:
- an internal memory configured to store the reliability table and system information; and
- a central processing unit configured to perform a function of the set value controller.

11. A method of operating a memory system, comprising:
- storing, in at least one of dies of the memory system, pieces of reliability grade information about the dies;
- storing and updating, in a memory controller of the memory system, a read count value, a program count value, and a number of free blocks as reference values for each of the dies for controlling the dies;
- receiving the reliability grade information from a die selected from among the dies, and selecting a reference value corresponding to the received reliability grade information from a reliability table included in the memory controller; and
- generating commands for managing the selected die based on the reliability grade information and the selected reference value, wherein the reliability table is configured to store the pieces of reliability grade information and the reference values respectively corresponding to the pieces of reliability grade information.

12. The method according to claim 11, wherein the storing of the pieces of reliability grade information includes determining the reliability grade information based on results of a test operation or based on positions of the dies on a wafer.

13. The method according to claim 12, wherein, when reliability grade information is determined based on results of a test operation, the reliability grade information is determined depending on a number of error bits detected in the test operation.

14. The method according to claim 12, wherein the test operation is performed as a test program operation, a test read operation or a test erase operation.

15. The method according to claim 12, wherein, when the reliability grade information is determined depending on the positions of the dies, the reliability grade information is determined depending on whether positions at which the dies are manufactured are present in a central region of the wafer or in an edge region of the wafer.

16. The method according to claim 11, wherein the commands are generated to perform a read reclaim operation, a wear-leveling operation or a garbage collection operation on the dies.

17. The method according to claim 11, wherein the reliability grade information is stored in a meta-block in which system data is stored, among a plurality of memory blocks included in the dies.

18. A memory system comprising:
- one or more memory devices each configured to store predetermined reliability grade information; and
- a memory controller configured to control each of the memory devices to perform a read reclaim operation based on the reliability grade information, wherein the reliability grade information of each memory device includes information on plural ranges of a cycled number and a plurality of trigger values respectively corresponding to the plural ranges, wherein the cycled number represents a number of operation times of a pair of erase and write operations performed to each of memory blocks, and wherein the memory controller comprises:
- a reliability table configured to store the pieces of reliability grade information and the reference values respectively corresponding to the pieces of reliability grade information; and
- a set value controller configured to receive the pieces of reliability grade information from the dies and select the reference values for managing the dies from the reliability table using the received reliability grade information.

19. The memory system according to claim 18, wherein the trigger values represent the cycled number to trigger the read reclaim operations to be performed to the memory blocks, or a number of operation times of a write operation performed to the memory devices to trigger a wear-leveling operation to be performed to the memory devices, or a number of free memory blocks within the memory devices to trigger a garbage collection operation to be performed to the memory devices.

\* \* \* \* \*